United States Patent Office 3,475,231
Patented Oct. 28, 1969

3,475,231
DESCALING PROCESS AND MATERIAL
Donald E. Carter and Kenneth Hurst, Chattanooga,
Tenn., assignors to Combustion Engineering, Inc.,
Windsor, Conn., a corporation of Delaware
No Drawing. Filed Dec. 28, 1966, Ser. No. 605,218
Int. Cl. C23f *17/00;* C21d *1/00;* C23g *1/00*
U.S. Cl. 148—13.1                                3 Claims

ABSTRACT OF THE DISCLOSURE

A method and materials for use in the heat treating of metals to inhibit the formation of scale and to remove scale particularly during quenching to increase the rate of heat transfer and thus the rate of cooling and to produce a scale-free product. The materials employed comprise a duplex coating which is coated on the metal prior to heating and which spalls or peels therefrom primarily upon quenching taking scale along with it. The first coating applied contains a salt mixture, preferably sodium and potassium chloride, together with a colloidal silica binder and water. The second coating contains refractory materials and water.

BACKGROUND OF THE INVENTION

When metals are heat treated, there is normally a relatively thick oxide scale formed in addition to any oxide film which may have already been present. This scale formation has at least three undesirable aspects: (1) it represents the destruction of a portion of the metal at the surface of the article being treated; (2) it reduces the rate of cooling of the article during quenching; and (3) the scale must be removed for subsequent processing.

The hardening of metals or alloys, with which this invention is primarily concerned, depends upon the rapid cooling of the metal from an elevated austenitizing temperature such that transformation of the austenite takes place at a sufficiently low temperature so as to form martensite. The normal hardening process is then completed with a tempering step. If the cooling rate is not sufficiently rapid, some transformation to bainite, pearlite, or ferrite may take place with a corresponding decrease in the percentage of martensite produced and the hardness developed. The scale pre-existing on the metal articles or the scale formed during heating acts as an insulating material during quenching, thus reducing the rate of heat transfer. It is therefore highly advantageous to have this scale removed prior to or immediate upon immersion into the quenching bath.

An object of the present invention is therefore to provide means and materials for removing scale from metals.

Another object of the present invention is to provide a technique for increasing the rate of heat transfer from metals during quenching in a heat treating process.

A more specific object of the invention is to provide materials for coating articles to be heat treated which will serve to remove scale from the articles, to increase the rate of cooling during quenching, and to produce heat treated articles which are scale free.

Other objects and advantages of the invention will be readily apparent from the following detailed description.

DESCRIPTION OF THE INVENTION

The present invention is carried out by applying to the metal articles which are to be heat treated a duplex coating of materials which will adhere to the metallic surface and remain intact during the heat treating process and which will protect the metal from oxidation and scale formation at the temperatures normally encountered during heat treating. This coating must be easily applied and economical enough to warrant its use. The coating must also be capable of spalling off the metal article, preferably upon quenching, such as by having a coefficient of expansion significantly different from that of the metal. The coating must also cling to or combine with any oxide film or scale material already on the surface and must carry this film or scale along with it when it spalls off. The metal will then be left relatively clean and free of heat treat scale. The term metal as employed in this description is intended to include alloys.

It has been found that the objects of the present invention are achieved by applying a duplex or two separate coatings to the metal surface prior to heat treating. The first coating applied to the metal surface contains a mixture of alkali metal salts, a colloidal silica material and water. The alkali metal salts which are employed in the first coating materials are preferably sodium and potassium chloride which together act as a fluxing agent at heat treating temperatures. This salt flux, which is molten at these temperatures of 1150° F. to 1650° F., prevents the oxidation of the surface metal and associates with the scale materials, FeO, $Fe_2O_3$, and $Fe_3O_4$; such that the scale will spall off with the salt coating upon cooling. The mechanism by which this association apparently comes about is by the salt flux actually taking iron oxide scale materials into solution although the present invention is not to be limited by any theory of operation. It has been found that a combination of salts such as sodium and potassium chloride is necessary to provide an effective scale removing coating. The optimum ratio of the sodium and potassium chloride salt mixture is 45% potassium chloride and 55% sodium chloride although this ratio may be varied as pointed out hereinafter.

Colloidal silica is an aqueous dispersion of particles of amorphous silica in the form of discrete, uniform spheres. Such a material is marketed under the trademark "Ludox" by E. I. du Pont de Nemours & Co. (Inc.) and is manufactured according to the Bechtold and Snyder U.S. Patent No. 2,574,902 and the Rule U.S. Patent No. 2,577,485. The amount of colloidal silica in the sols employed is preferably about 30% expressed as percent $SiO_2$ by weight. The weight ratio of $SiO_2$ to $Na_2O$ may, for example, range from 90 to 300. The colloidal silica in this first coating composition functions as an adhesive or bonding material to hold the salt mixture together and onto the metal surface. The colloidal silica further acts to form the coating into a hard mass which will crack or spall upon cooling from the heat treating temperatures and thus peel from the metal surface.

Although the ratio of potassium to sodium chloride in the salt mixture is not critical and although any ratio of the two salts will exhibit some degree of effectiveness, the practical limits for an effective salt mixture for use in the coating are as follows in weight percentage:

| | Percent |
|---|---|
| Potassium chloride | 30–55 |
| Sodium chloride | 45–70 |

The amount of colloidal silica binder which is contained in the first coating should not vary extensively since if there is too much, there will be insufficient salt adjacent the metal surface to function properly; and if there is too little, there will not be a proper bond. The permissible range for the ratio of salt to silica is therefore a functional consideration. The optimum ratio of colloidal silica to salt will vary depending upon the particular type of colloidal silica used as well as the various other conditions existing in the particular heat treating situation. An example of a practical ratio for the salt and colloidal silica employing a 45% potassium chloride and 55% sodium chloride salt mixture and colloidal silica containing 30% by weight of colloidal silica expressed as $SiO_2$ with a $SiO_2/Na_2O$ ratio of 95 is as follows:

| | |
|---|---|
| Salt mixture _____ grams__ | 910 |
| Colloidal silica _____ ml__ | 1200 |

Additional water is added to this mixture in an amount required to give the proper consistency for application to the work piece. An example of a specific formulation to yield one gallon of mixture is as follows:

| | |
|---|---|
| Potassium chloride _____ grams__ | 410 |
| Sodium chloride _____ do____ | 500 |
| Colloidal silica _____ ml__ | 1200 |
| Water to make 1 gallon. | |

The second coating comprises a refractory material in slurry form which is applied directly over the dried first coating. This refractory serves as a shield to protect the molten salt mixture adjacent the metal surface from the furnace gases which might have an adverse effect upon the salt and its reactions with the scale. The refractory also acts, as does the colloidal silica, to form a hard coating which will crack or spall upon cooling causing the coatings to peel from the metal surface. A suitable refractory material for use in the present invention is an aluminum silicate base refractory having the following approximate formulation in weight percentage.

Chemical analysis:

| | Percent |
|---|---|
| $SiO_2$ | 41.3 |
| $Al_2O_3$ | 49.08 |
| $Fe_2O_3$ | .2 |
| Alkali | 3.4 |
| Ign. loss | 6.0 |

Such a refractory is marketed, for example, by the Refractory and Insulation Corporation under the trade name "SUPER #3000" as a thick paste containing about 16–20% water, but the invention is not limited to this specific refractory formula. The only requirements that the refractory should exhibit are: that it be capable of acting as a bonding agent, that it form a suitable hard coating together with the salt, and that it be compatible with the action of the salt mixture on the scale. The refractory should not contain excessive quantities of alkalki or other chemicals which might adversely effect the salt and the fluxing action of the salt with the scale during the heat-up. The refractory is mixed with water in a proportion suitable for applying to the work piece. A one-to-one weight ratio is satisfactory for brushing, while a one part refractory to five parts water mixture can be applied by spraying.

The first step in the coating and heat treating procedure is to free the metal surface of any grease, loose dirt, loose scale, or other material which might interfere with the coating process or the action of the salt on the scale. The coating mixtures are thoroughly mixed and maintained in this condition throughout the coating process. The coatings may be applied to the metal in any desirable manner such as by brushing, spraying, or dipping. The consistency of either of the coatings may be adjusted by adding more or less water depending upon the method of application selected. It may be desirable and necessary, for instance, to thin the materials with additional water when spraying as pointed out above with regard to the refractory slurry. It may be desirable before applying the first coating, to heat the work piece to a temperature of from 175° F. to 300° F. to remove superfluous water and promote adherence of the coating. After the first coating is applied, it is permitted to dry at least to some degree before applying the second coating. After the second coating has been applied, it is also allowed to dry before introducing the work piece into the heat treating furnace. If the coatings are wet upon introduction into the furnace at 1200° F., blistering may occur. However, this may tend to take care of itself by self-healing due to the melting of the salts. The work piece is then heated the required length of time in the furnace and then cooled. Although cooling according to the present invention is preferably carried out by water quenching, the invention also contemplates other liquid or fluid quenching including air quenching and furnace quenching. The term quenching is intended to include all such forms of cooling. The most satisfactory release of the coating and scale from the metal is achieved, however, with the water quenching. The coating and scale release from the metal work piece begins upon removal from the heat treating furnace, but the bulk of the peeling occurs upon the initial insertion of the piece into the water quenching bath. This is, of course, due to the rapid cooling and contraction of the coating as contrasted to the rate of cooling and contraction of the metal.

An added effect which may be obtained from the salt coating is that the salts which go into solution upon water quenching tend to reduce the duration of the vapor blanket stage. This, of course, would increase the rate of cooling because of better heat transfer.

We claim:
1. A method of heat treating a metal member comprising the steps of applying to the surface of said member a first coating of descaling material consisting essentially of a salt mixture containing KCl and NaCl, sufficient colloidal silica to bond the salt to the member, and water; drying said first coating; applying a second coating over said first coating; said second coating consisting essentially of a refractory slurry containing a bonding refractory material compatible with said salt mixture which will form a hard protective coating with said salt mixture; heating said member with said coatings thereon above the critical heat treating temperature for the required length of time and quenching said member whereby said coatings will spall from said member together with scale from said member.

2. A method of heat treating as recited in claim 1 wherein said salt mixture consists of from 30–55 percent KCl and from 45–70 percent NaCl by weight and wherein said bonding refractory material comprises an aluminum silicate base refractory.

3. A method of heat treating a metal member comprising the steps of applying to the surface of said member a first coating of descaling material consisting essentially of a salt mixture of KCl and NaCl, a colloidal silica binder, and water, said salt mixture containing from 30–35 percent KCl and from 45–70 percent NaCl by weight, and the ratio of the salt mixture to the colloidal silica binder being approximately 910 grams of salt mixture to 1200 milliliters of colloidal silica together with sufficient water to yield a desired consistency; applying a second coating over said first coating; said second coating consisting essentially of an aluminum silicate base refractory slurry; heating said member with said coatings thereon above the critical heat treating temperature for the required length of time and quenching said member whereby said coatings will spall from said member together with scale from said member.

References Cited

UNITED STATES PATENTS

| | | | |
|---|---|---|---|
| 2,121,606 | 6/1938 | McCulloch | 148—22 X |
| 3,178,322 | 4/1965 | Schneider | 148—27 X |
| 3,372,066 | 3/1968 | Quaas | 148—26 X |

CHARLES N. LOVELL, Primary Examiner

U.S. Cl. X.R.

148—22, 27

PO-1050
(5/69)

UNITED STATES PATENT OFFICE
CERTIFICATE OF CORRECTION

Patent No. 3,475,231          Dated October 28, 1969

Inventor(s) Donald E. Carter and Kenneth Hurst

It is certified that error appears in the above-identified patent and that said Letters Patent are hereby corrected as shown below:

Column 4, line 49, "35" should read --55--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents